Patented Mar. 25, 1952

2,590,655

UNITED STATES PATENT OFFICE 2,590,655

MODIFIED TALL OIL ESTERS AND PROCESS
OF PREPARING THE SAME

Alfred F. Schmutzler, Teaneck, N. J., assignor to American Cyanamid Company, New York, N. Y., a corporation of Maine No Drawing. Application August 15, 1950,
Serial No. 179,633

15 Claims. (Cl. 260—23)

This invention relates to modified talloil esters and to the processes of preparing the same. More particularly, it relates to the esterification of talloil with a polyhydric alcohol and the subsequent reaction of this ester with monomeric acrylonitrile or with mixtures of monomeric acrylonitrile and styrene. This invention further relates to a process for the preparation of a talloil ester which is modified subsequent to esterification with monomeric acrylonitrile or mixtures of monomeric acrylonitrile and monomeric styrene in the presence of a mutually inert solvent. This invention further relates to esterification of talloil with a polyhydric alcohol in a mutually inert solvent followed by the subsequent coreaction of the ester with monomeric acrylonitrile or monomeric acrylonitrile and styrene.

One of the objects of the present invention is to prepare acrylonitrile modified talloil esters. A further object of the present invention is to prepare acrylonitrile and styrene modified talloil esters. A still further object of the present invention is to prepare acrylonitrile modified talloil esters or acrylonitrile and styrene modified talloil ester in a mutually inert solvent. A still further object of the present invention is to prepare modified talloil esters having unusual properties and characteristics which are useful in a number of commercial applications such as in the preparation of paints, enamels, printing inks, and other surface coating materials. A further object of the present invention is to prepare modified talloil esters which may be used as adhesives, core binders and in the treatment of fibrous materials and, more particularly, cellulose fibrous materials.

Reference is made to my copending applications, Serial Nos. 88,044 and 88,045, filed April 16, 1949, entitled "Talloil Modified Alkyd Resins and Process for Preparing the Same" and "Printing Inks and Process of Preparing the Same," respectively. The former application deals with the preparation of talloil modified alkyd resins which are subsequently modified with monomeric acrylonitrile or with mixtures of monomeric acrylonitrile and styrene. The latter case deals with the preparation of printing inks wherein the monomer modified talloil alkyd resins of the class described in the former patent application are used.

Talloil, generally, has its principal components about 46–50% rosin acids and about 43–47% of fatty acids plus relatively small amounts (6%–8%) of unsaponifiable materials, ash, and moisture. It is not imperative that the talloil used in the practice of the process of the present invention be the refined talloil, as crude talloil may readily be used. It is preferred, however, to use the refined talloil as improved results, particularly with respect to color are accomplished by use of the refined talloil.

In the esterification reaction of the talloil, it is possible to use practically any of the saturated aliphatic polyhydric alcohols. Amongst those which may be used are diethylene glycol, ethylene glycol, trimethylene glycol, tetramethylene glycol, hexamethylene glycol, pinacol, arabitol, xylitol, adonitol, mannitol, dulcitol, sorbitol, glycerol, pentaerythritol, and the like. Obviously, these polyhydric alcohols may be used singly or in combination with one another. In my copending applications referred to hereinafter, I modify talloil alkyd resins with monomeric acrylonitrile or acrylonitrile and monomeric styrene. In the practice of the process of the present invention, I do not use any polycarboxylic acid, and I prefer that there be no appreciable amount of polycarboxylic acid present in the reaction product. In order to further delineate the concept of the present invention, the following examples are set forth in which all parts are parts by weight. It should be remembered that any specific enumeration of detail in these examples is by way of illustration only and should not be interpreted as a limitation on the case except as indicated in the appended claims. All Gardner-Holdt viscosity readings were taken at 25° C.

*Example 1*

195 parts of sorbitol, 1530 parts of refined talloil, and 81 parts of Varsol No. 1 (a high boiling aliphatic petroleum hydrocarbon of low kauri-butanol value) are introduced into a suitable reaction chamber equipped with thermometer, stirrer, reflux condenser, and water separator. The mixture is heated with constant stirring under reflux conditions until 110 parts of water are given off. This will require heating at a temperature between 160° and 274° C. for a 12 hour period at which point the acid number of the reaction product is about 15 and the mixture contains about 95% of the talloil ester and about 5% solvent. The viscosity of a 60% solids solution of the ester in P-1 ink oil (a high boiling aliphatic petroleum hydrocarbon of low kauri-butanol value), was G on the Gardner-Holdt scale. To the diluted sample, containing 60% solids, add 0.03% cobalt as cobalt naphthenate. A thin film of the resinous solution was applied to a glass panel and permitted to dry. The film remained soft and tacky for more than 72 hours.

Example 2

210 parts of the sorbitol talloil ester (95% solids in Varsol No. 1, prepared according to Example 1), 6 parts of acrylonitrile and 35 parts of styrene and 0.4 part of acetaldehyde were introduced into a suitable reaction chamber equipped with thermometer, stirrer and reflux condenser, and heated to approximately 60° C. There is then added 0.4 part of ditertiary butylperoxide and the heating is continued with stirring under reflux conditions until a temperature of 136° C. is reached. There is then added 150 parts of P-1 ink oil and the batch is permitted to cool. The viscosity of the resulting 60% solution of monomer modified talloil ester was about M on the Gardner-Holdt scale. To the resinous solution thus prepared, there is then added 0.03% cobalt as cobalt naphthenate and a thin film of the resin solution thus prepared is applied to a glass plate and permitted to dry. The resulting film was hard, dry, and tack-free in a 12 hour period.

Example 3

1360 parts of refined talloil, 143 parts of pentaerythritol, and 63 parts of Varsol No. 1 are introduced into a suitable reaction chamber equipped with thermometer, stirrer, reflux condenser, and an automatic water separator. The mixture is heated with constant stirring at a temperature between 160° and 280° C. for about 14 hours until the acid number was about 5.6. The resulting resin solution contains about 95% talloil ester and about 5% solvent. When the resinous solution is diluted by the addition of P-1 ink oil to a 60% solids solution, it has a viscosity of N on the Gardner-Holdt scale. To a sample of 60% solid solution was added 0.03% cobalt as cobalt naphthenate and a thin film was applied to a glass plate and permitted to dry. The film remained soft and tacky for over 72 hours.

Example 4

157.5 parts of pentaerythritol talloil ester (95% solids prepared according to Example 3), 26 parts of monomeric styrene, 5 parts of monomeric acrylonitrile, 0.3 part acetaldehyde and 1.5 parts of cumene hydroperoxide are introduced into a suitable chamber equipped with thermometer, stirrer, and reflux condenser, and heated with constant stirring until a temperature of about 300° C. is reached. This is accomplished in about 26 hours. The batch is then cooled to about 200° C. at which point 112.5 parts of P-1 ink oil is added and the stirring and cooling continued. The resulting 60% solids solution of the monomer modified talloil ester had a viscosity of about U on the Gardner-Holdt scale. To a sample of the modified ester is added 0.03% cobalt as cobalt naphthenate and the resultant resinous solution is applied as a thin film to a glass plate and permitted to dry. The film thus produced is dry, hard and tack-free after drying for 12 hours.

The following example is set forth in order to illustrate the importance of using acrylonitrile alone or acrylonitrile and styrene in combination with one another in the modification of the talloil ester as contrasted with the use of monomeric styrene alone. Particular attention is directed to the differences in viscosity and drying time.

Example 5

157.5 parts of pentaerythritol talloil ester (95% solids prepared in accordance with Example 3), 31 parts of styrene and 0.03 part of acetaldehyde and 1.5 parts of cumene hydroperoxide are introduced into a suitable reaction chamber equipped as in the previous examples. The reaction mixture is heated until a temperature of about 300° C. is reached, the batch is cooled to about 200° C. and 112.5 parts of P-1 ink oil is added. The viscosity of the resulting styrene modified talloil ester was N on the Gardner-Holdt scale. A thin film of the solution (containing 0.03% cobalt as cobalt naphthenate) was permitted to dry but was still tacky after 24 hours.

Example 6

179 parts of pentaerythritol, 1700 parts of refined talloil are introduced into a suitable reaction chamber equipped as before and heated to 160-305° C. over a 12 hour period while bubbling nitrogen through the melted resin. The acid number of the resin was 9 and had an extremely high viscosity. As a 60% solution in P-1 ink oil, the resin had a viscosity of N on the Gardner-Holdt scale.

Example 7

200 parts of the pentaerythritol talloil ester (100% solids prepared in accordance with Example 6), 3 parts cumene hydroperoxide, 1 part of ethyl ether of diethylene glycol, 0.4 part of acetone, 0.5 part zinc dust, 1.2% of cobalt naphthenate in 0.5 part Varsol No. 1 are introduced into a suitable reaction chamber equipped as above and heated to a temperature of about 95-100° C. whereupon a mixture of 20 parts of styrene and 5 parts of acrylonitrile are added gradually over a 30 minute period. After the addition is completed, the mixture is stirred for an additional 30 minutes and then heated gradually to 300° C. in 6 hours. The resulting resin is a solid at room temperature with a melting point at 90° C. A 60% solids solution of the resin in P-1 ink oil has a viscosity of V on the Gardner-Holdt scale. A thin film of this resinous solution (containing a total of 0.03% cobalt as cobalt naphthenate) was permitted to dry and was hard and tack-free in 6 hours.

Example 7 is repeated in all details except that in place of the 20 parts of styrene, and 5 parts of acrylonitrile, there is added 10 parts of acrylonitrile. A 60% solids solution of the resin in P-1 ink oil is approximately U on the Gardner-Holdt scale.

Example 8

200 parts of a pentaerythritol talloil ester (100% solids prepared according to Example 6), 3 parts of cumene hydroperoxide, 1 part of ethylene ether of diethylene glycol, 0.4 part acetone, 0.5 part mineral spirits containing 1.2% cobalt naphthenate, and 0.5 part zinc dust are introduced into a suitable reaction chamber equipped with stirrer, thermometer, and reflux condenser and the mixture is heated to about 95-100° C. whereupon 20 parts of monomeric styrene and 5 parts of acrylonitrile are added slowly over a 30 minute period. After the addition is completed, the mixture is maintained at 95-100° C. for 30 minutes and then heated gradually to about 280° C. in 5 hours. The resulting resin has a softening point of 80° C. A 60% solids solution of the resin in P-1 ink oil has a viscosity of W on the Gardner-Holdt scale. A thin film of this resinous solution (containing a total of 0.03% cobalt naphthenate) is distributed on a glass plate and permitted to dry. The film dries to a hard, tack-free surface in 6 hours.

Example 9

200 parts of a pentaerythritol talloil ester (100% solids prepared according to Example 6), 8 parts of acrylonitrile, 12 parts of styrene are introduced into a suitable reaction chamber equipped with thermometer, stirrer, and reflux condenser and heated to 80–90° C. until the mixture appears to be homogeneous whereupon 3 parts cumene hydroperoxide, 1 part ethyl ether of diethylene glycol and 0.4 part acetone is added. The stirring is continued for 1 hour at 80° C. The temperature is then increased gradually to about 205° C. over a 6 hour period while maintaining continuous stirring. The resulting resin remained soft due to the lower final temperature but the color remained exceptionally light. A 60% solids solution of the resin in P-1 ink oil has a viscosity of T on the Gardner-Holdt scale. A thin film of the resin containing 0.03% cobalt, as cobalt naphthenate, dried to a hard, tack-free film in 10 hours.

When the monomeric acrylonitrile is used alone to modify the talloil ester, it should be used in an amount between 4–28% by weight based on the total weight and preferably 4–10% by weight. When the combination of monomers is used, the total weight of monomers present should be between about 5–35% by weight based on the total weight of the resin and preferably 10–20% by weight. Of this total amount of monomers, some acrylonitrile must be present. The percentage range of the acrylonitrile present, when the combination is used, should be between about 1%–25% by weight based on the total weight of the resin with 2–8% preferred. The amount of styrene present when the combination of monomers is used may be varied between about 2–34% by weight based on the total weight of the resin with 2–18% preferred.

In the coreaction of the talloil with the polyhydric alcohol, it is desired that there be a sufficient amount of polyhydric alcohol so as to enable one to accomplish substantially complete esterification. For this reason, it is generally desired to use about 5–10% in excess of the stoichiometrical amounts of polyhydric alcohol calculated to react completely with the talloil so as to produce an acid number at the end of the esterification below about 35 and preferably below about 20.

It has been indicated in the examples that the esterification and copolymerization steps can be accomplished in the absence of any solvent whatever. It is desired however, in order to facilitate the copolymerization, to use a mutually inert solvent, i. e., a solvent which is inert to all of the reactive components of the reaction. As representative solvents, it is desired to use high boiling aliphatic petroleum hydrocarbons of low kauri-butanol value such as the following all of which are high boiling aliphatic petroleum hydrocarbons: Varsol No. 1, P-1 ink oil, Deo 470 oil, 590 oil, No. 80 White oil and P-2 ink oil. These solvents have kauri-butanol values varying between about 18.5 and 39. The kauri-butanol values and other physical factors relating to the boiling points of these petroleum hydrocarbon fractions are shown below:

|  | Kauri-Butanol Value | Initial Boiling Point | 5% | 95% | A.S.T.M. E.P. |
|---|---|---|---|---|---|
|  |  |  | °F. | °F. | °F. |
| American Petroleum: |  |  |  |  |  |
| P-1 Ink Oil | 25.0 | 460° F. | 470 | 501 | 530 |
| P-2 Ink Oil | 22.6 | 513° F. | 521 | 555 | 565 |
| Magee Bros., Chic., Ill.: |  |  |  |  |  |
| Deodorized Petroleum Solvent #590 | 20.2 | 590° F. | 596 | 627 | 636 |
| Deodorized Petroleum Solvent #470 | 23 | 467° F. | 474 | 499 | 519 |
| Varsol #1 | 36–39 | 315° F. | 10%–334 | 50%–342 90%–367 | 392 |
| No. 80 White Oil | 18–21 | 700–900° C. |  |  |  |

One could use solvents with kauri-butanol values between 16 and 50, but it is actually preferred to use those which have kauri-butanol values between 20 and 40. As a further modification of the process, it is possible to accomplish the esterification step as well as the copolymerization in the presence of a mutually inert solvent.

It is not necessary to use a catalytic agent in the practice of the process of the present invention. However, the use of such agent will serve to increase the speed of reaction. Representative of the group of catalytic agents which may be used are zinc dust, acetone, cumene hydroperoxide, zinc peroxide, calcium peroxide, acetaldehyde, benzoyl peroxide, and the like. These catalytic agents may be used separately or in combination with one another in varying proportions but generally in catalytic amounts. Amongst the many uses which the present resins have, their use in printing inks is outstanding. In order to illustrate the formulation of a printing ink composition, the following example is set forth in which all parts are parts by weight.

Example 10

36 parts of a 60% solution in P-1 ink oil of the modified talloil ester (prepared according to Example 7) 1.5 parts of alkali blue toner (pigment), 1 part of a wax compound consisting of 25% carnauba wax and 75% of a 60% solution of the modified talloil ester (prepared according to Example 7), 5 parts P-1 ink oil, 12 parts of Neospectra Mark III carbon black (pigment), 1 part lead naphthenate solution in Varsol No. 1 containing 24% lead, and 1 part of cobalt naphthenate in Varsol No. 1 containing 6% cobalt are blended and mixed and then milled on a three roller mill. The resulting ink dries on paper in ½ hour to a glossy, tack-free film. It becomes hard and smudge proof in about 2 hours.

Results comparable to those set forth in Examle 10 can be obtained by the addition of the vehicles from the other examples set forth hereinabove to illustrate the concept of the present invention such as by the substitution in the place of the pentaerythritol talloil esters, the sorbitol ester prepared according to Example 2. All other factors may be permitted to remain the same. In the place of carbon black pigment, any other pigment may be used such as lithol toners, toluidine toners, chrome yellow, iron blues, phthalocyanine blue, benzidine yellow, and the like. Those pigments which have a lower oil adsorption than the carbon black pigment used in Example 10 will require that the amount of vehicle (the solution of

I claim:

1. A process for preparing an acrylonitrile modified talloil ester which comprises esterifying talloil with a saturated aliphatic polyhydric alcohol in the absence of an appreciabe amount of any polycarboxylic acid and heat-reacting the resulting product with 4%–28% of monomeric acrylonitrile.

2. A process for preparing an acrylonitrile modified talloil ester which comprises esterifying talloil with a saturated aliphatic polyhydric alcohol in a mutually inert solvent, in the absence of an appreciable amount of any polycarboxylic acid, then heat-reacting the resulting product with 4–28% of monomeric acrylonitrile.

3. A process for preparing an acrylonitrile modified talloil ester which comprises esterifying talloil with a saturated aliphatic polyhydric alcohol, in the absence of an appreciable amount of any polycarboxylic acid, in a mutually inert, high boiling, aliphatic petroleum hydrocarbon of low kauri-butanol value, then heat-reacting the resulting product with 4%–28% monomeric acrylonitrile.

4. A process for preparing a modified talloil ester which comprises esterifying talloil with a saturated aliphatic polyhydric alcohol, in the absence of an appreciable amount of any polycarboxylic acid, and then heat reacting this resulting product with 1%–25% by weight of monomeric acrylonitrile and 2%–34% by weight of monomeric styrene wherein the total amount of said monomer present varies between 5%–35% by weight based on the total weight of said resin.

5. A process for preparing a modified talloil ester comprising esterifying talloil with a saturated aliphatic polyhydric alcohol, in the absence of an appreciable amount of any polycarboxylic acid, in a mutually inert solvent, then heat-reacting the resulting product with 1%–25% by weight of monomeric acrylonitrile and 2%–34% by weight of monomeric styrene wherein the total amount of said monomers present varies between 5–35% by weight based on the total weight of said resin.

6. A process for preparing modified talloil esters comprising esterifying talloil with a saturated aliphatic polyhydric alcohol in the absence of an appreciable amount of any polycarboxylic acid, in a mutually inert, high boiling, aliphatic petroleum hydrocarbon of low kauri-butanol value, then heat-reacting this resulting product with 1–25% by weight of monomeric acrylonitrile and 2–34% by weight of monomeric styrene wherein the total amount of said monomers present varies between 5–35% by weight based on the total weight of said resin.

7. A resin prepared by heat-reacting 4–28% by weight of monomeric acrylonitrile with a talloil ester of a saturated aliphatic polyhydric alcohol, wherein said percentages are based on the total weight of said resin.

8. A resin prepared by heat-reacting 1–25% by weight of monomeric acrylonitrile and 2–34% by weight of monomeric styrene with a talloil ester of a saturated aliphatic polyhydric alcohol, wherein the total amount of said monomers present varies between 5–35% by weight based on the total weight of said resin.

9. The process according to claim 1, wherein the polyhydric alcohol is glycerol.

10. The process according to claim 1, wherein the polyhydric alcohol is ethylene glycol.

11. The process according to claim 1, wherein the polyhydric alcohol is pentaerythritol.

12. A process for preparing a modified talloil ester of a polyhydric alcohol, which comprises esterifying talloil with a saturated aliphatic polyhydric alcohol, in the absence of an appreciable amount of any polycarboxylic acid, then heat-reacting the resulting product with 4–28% by weight of monomeric acrylonitrile in a mutually inert solvent.

13. A process for preparing a modified talloil ester which comprises esterifying talloil with a saturated aliphatic polyhydric alcohol, in the absence of an appreciable amount of any polycarboxylic acid, then heat-reacting the resulting product with 1–25% by weight of monomeric acrylonitrile and 2–34% by weight of monomeric styrene, wherein the total amount of said monomers present varies between 5–35% by weight based on the total weight of said resin, in the presence of a mutually inert solvent.

14. A printing ink composition comprising an acrylonitrile modified talloil ester of a saturated aliphatic polyhydric alcohol, containing 4–28% by weight of acrylonitrile, based on the total weight of the modified ester, a solvent, and pigment.

15. A printing ink composition comprising an acrylonitrile and styrene modified talloil ester of a saturated aliphatic polyhydric alcohol, containing 1%–25% of acrylontrile and 2%–34% of styrene wherein the total weight of reacted monomers is between 5%–35% by weight based on the total weight of the modified ester, a solvent and pigment.

ALFRED F. SCHMUTZLER.

No references cited.